(12) United States Patent
Sjölinder

(10) Patent No.: US 6,205,278 B1
(45) Date of Patent: Mar. 20, 2001

(54) MULTIFIBER CABLING SYSTEM

(75) Inventor: Sven Sjölinder, Hägersten (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/465,937

(22) Filed: Dec. 17, 1999

Related U.S. Application Data

(63) Continuation of application No. PCT/SE98/01181, filed on Jun. 18, 1998.

(30) Foreign Application Priority Data

Jun. 18, 1997 (SE) .................................................... 9702347
Jun. 18, 1997 (SE) .................................................... 9702348

(51) Int. Cl.⁷ .................................................... G02B 6/44
(52) U.S. Cl. .......................... 385/114; 385/115; 385/100; 385/24
(58) Field of Search ............................. 385/24, 100, 114, 385/115, 116, 123

(56) References Cited

U.S. PATENT DOCUMENTS

| | | | |
|---|---|---|---|
| 5,222,179 | * 6/1993 | Auteri | 385/114 |
| 5,367,598 | 11/1994 | Devenish, III et al. | 385/135 |
| 5,561,731 | * 10/1996 | Cooke et al. | 385/114 |
| 5,604,834 | * 2/1997 | Beasley, Jr. et al. | 385/114 |
| 6,035,088 | * 3/2000 | Chandraiah et al. | 385/114 |

FOREIGN PATENT DOCUMENTS

| | | | |
|---|---|---|---|
| 0 549 862 A1 | 7/1993 | (EP) | 385/135 X |
| 2 167 609 | 10/1984 | (GB) | 385/135 X |
| WO 93/22695 | 11/1993 | (WO) | 385/135 X |

* cited by examiner

*Primary Examiner*—Brian Healy

(57) ABSTRACT

An optical network has a single cable (15) holding ribbon fibers (9, 11, 13) connected to line boards (1) in a station (7) for transmitting and receiving signals on the optical fibers of the cable. At a geographical location (3, 5) some ribbon fibers (9, 11) are cut off and a fan-out is made for both cut-off ends splitting the ends into individual fibers (19). In a branching point (at 3) having more individual cut-off fibers than subscribers the remaining cut-off fibers are connected through by fiber pieces (21), so that these fibers continue uninterruptedly through the branching point. Another branching point (at 5) has more subscribers than individual fibers in the cut-off ribbon fibers and then the subscribers are connected to individual fibers both in the portion of ribbon fibers close to the line boards and to the cut-off portions distant therefrom. At the end of the cable (15) suitable ends of the optical fibers are connected to each other through connector strips (23). In this way the capacity of the ribbon fibers (9, 11) can be efficiently used. The line boards (1) are each adapted to be connected to only one ribbon fiber. In order to allow a minimum number of line boards (1), at the head end of the cable two or more ribbon fibers (9, 11) can be connected to the same line board (1), so that the unused fibers in each of the ribbon fibers are not connected to any line board. When adding more subscribers to the network, a connector is removed, another line board (1) can then be added to the station (7) and the respective ribbon fibers (9, 11) are then connected to line boards (1) of their own.

5 Claims, 4 Drawing Sheets

Example of fiber positions in case of n=m=p=12 and three connectors

MULTIFIBER CABLING SYSTEM

This is a continuation of PCT application No. PCT/SE98/01181, filed Jun. 18, 1998.

The present invention relates to a cabling system for fiber optical networks which have a plurality of optical fibers used in each link, in particular networks which have one or more ribbon fibers in each link. The present invention also relates to a fiber optical network and in particular to an optical connector to be used in fiber optical networks, the network being the kind having a plurality of optical fibers used in each link, in particular a network which has one or more ribbon fibers in each link.

BACKGROUND

Fiber optical networks are nowadays built and widely expanded and there is a great interest in providing, in addition to branches to companies, institutions, etc. also branches to private subscribers, i.e. to apartments, private homes and estates, etc., in order to allow communication having high velocity and high capability. Then there is also an interest in reducing the costs for such installations. However, in fiber optical networks the most costly components generally are the cabling system and the laser devices used for injecting and modulating light signals transmitted in optical fibers. One way of reducing the cost is to use optical ribbon cables or ribbon fibers allowing cabling systems to be more easily handled. Then also array devices can be used provided with appropriate multifiber connectors. However, when building an optical fiber network, the final number of subscribers and the geographical distribution thereof are never fully known and thus the network must be dimensioned taking this into account. This will in almost all cases mean that in actual use of the network a number of fibers in links in the system will not be used. Then a corresponding number of the element devices of array devices will not be used. Also, the ribbon fibers are made in definite capacities including e.g. 4, 8 and 12 optical fibers. Then, if a connection line is to be built to a geographical location where one or two subscribers reside, perhaps a fiber ribbon holding four fibers is used, this resulting in that at least two fibers of the ribbon are not used. In this way the advantage of introducing fiber ribbons and device arrays can be lost.

Optical fiber networks/cabling systems having branching points are disclosed in e.g. the published European patent application No. 0 549 862 and the British published Patent application No. 2 167 609. Optical connectors for such networks/systems are disclosed in e.g. the published International patent application No. WO 93/22695 and the published British patent applications No. 2 191 598 and 2 255 652.

SUMMARY

It is an object of the present invention to provide a cabling system for a fiber optical network that uses the fibers of the cables in an efficient way.

The problem solved by the invention is thus how to provide a system for efficiently using a single optical cable holding a multitude of fiber ribbons, i.e. how to arrange that as small portions of the individual optical fibers as possible are not used in actual installation and also how to arrange in a simple way that a small number of line boards can be used.

Thus, generally, for transmitting to and receiving information on optical fibers from subscribers which reside at different geographical locations a single optocable is used holding a plurality of parallel ribbon fibers. The cable is connected to some central station, e.g. line boards in a telecommunication station. Array devices connected to the ribbon fibers can there be used for transmitting and receiving signals on the optical fibers of the cable. At a geographical location, where there are subscribers, a sufficient number of ribbon fibers are cut off and a fan-out is made for both cut-off ends, splitting the ends into individual fibers. In such a branching point, where there are more individual cut-off fibers than there are subscribers, the remaining cut-off fibers are connected through by means of interconnecting fiber pieces, so that these fibers continue uninterruptedly through the branching point. In another branching point there are more subscribers than individual fibers in the cut-off ribbon fibers and then the subscribers are connected to individual fibers both in the portions of ribbon fibers close to the line boards and to the cut-off portions distant therefrom. At the non-connected end of the cable suitable ends of the optical fibers therein are connected to each other, so that a subscriber for instance can be connected through a piece of fiber extending to the end of the cable, there through a short fiber piece to an end of another fiber, this other fiber extending to a branching point where it is connected through to a fiber extending directly to the central station. In this way the capacity of the ribbon fibers can be used efficiently, also in the case where at a place there are a number of subscribers which is not an even multiple of the number of individual fibers in a ribbon fiber.

Thus, this system reduces the above-mentioned disadvantage by combining partly filled ribbon fibers at a far end of a cable so that fully or almost fully used ribbon fibers are obtained. Thus, the cabling system is almost fully used and nearly all pieces of fibers are used for transferring information.

Thus, as described above, at each geographical location, where there are subscribers to be connected to the network, a sufficient number of ribbon fibers are cut off. This will in many cases result in that there are individual fibers which are not used in the cut-off ribbon fibers. Two or more such ribbon fibers holding a sufficient total number of unused fibers can then be connected to the same line board by a suitably designed connector. In this way a small number of line boards can be used and this number can then easily be increased to connect the ribbon fibers directly by removing the connector.

For connection to a line board a connector can be used having a first side and second side intended for connecting optical ribbon fibers, these sides being substantially flat and parallel to each other. A ribbon fiber interface is provided at the first side and at least two ribbon fiber interfaces are provided at the second side. All of the interfaces are preferably adapted for fibers ribbons comprising the same number of individual optical fibers. Each such fiber interface has connection points inside the connector. All connection points of the interface at the first side are connected by optical waveguides such as loose optical fiber pieces to connection points of interfaces at the second side, so that at least one of the connection points of each interface at the second side is connected to an optical waveguide. The remaining connection points of each interface at the second side are not connected to any other connection point.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
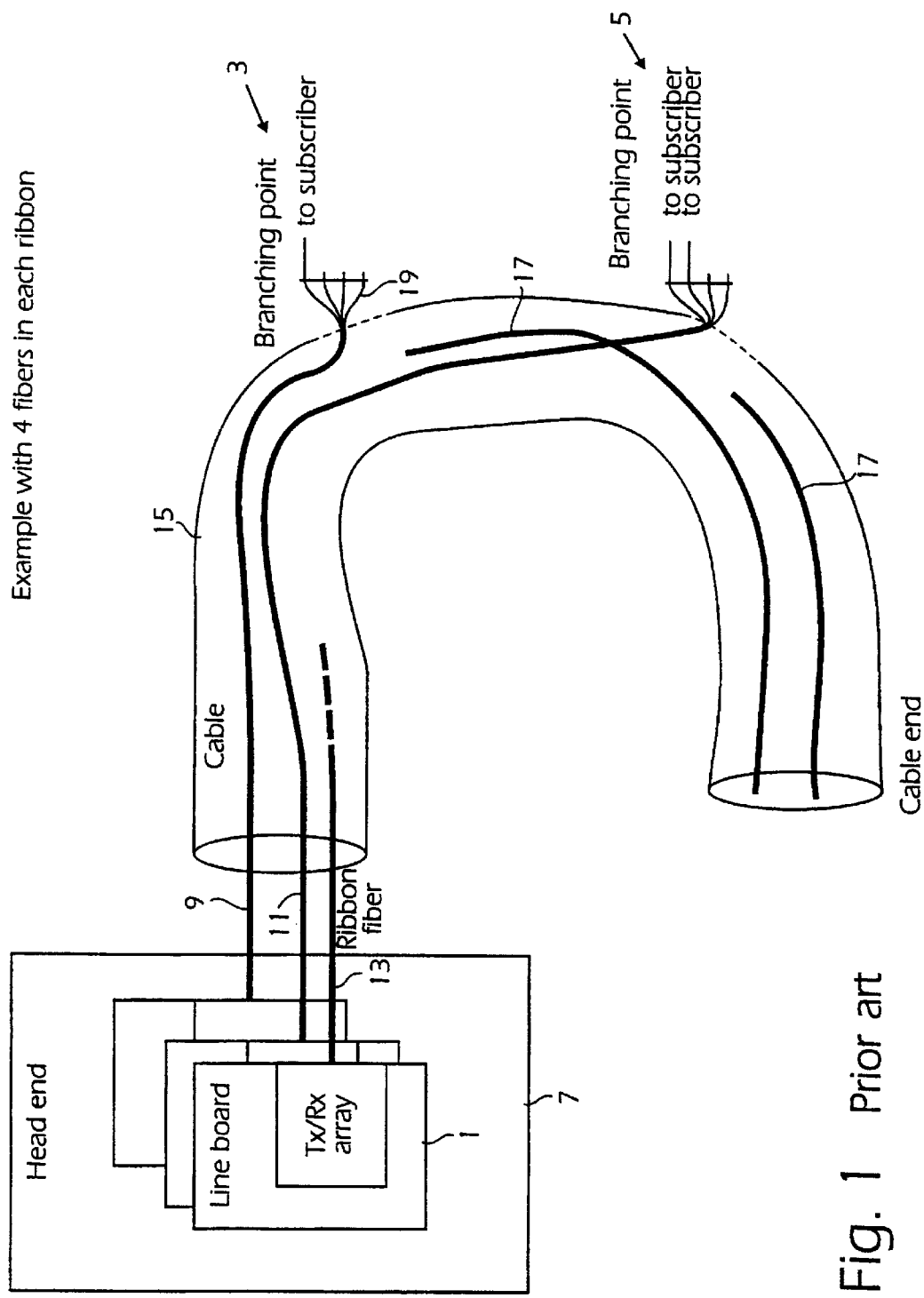
FIG. 1 is a schematic view of a portion of a telecommunication network according to prior art illustrating connection of subscribers to line boards.

The system depicted in FIG. 1 is a portion of a telecommunication network using fiber optical communication from line boards 1 to subscribers located at two distinct geographical locations 3, 5. The line boards 1 are placed in a telecommunication station 7 which is connected to some larger transport network, not shown. In the line boards I optical transmitters and other devices are arranged as array devices, not shown, coupled to outgoing optical lines. Thus, from each line board 1 extends a ribbon fiber 9, 11, 13 which is connected to the array devices of the board e.g. by a fiber ribbon connector, not shown. A large number of such fiber ribbons 9, 11, 13 are brought together in a fiber optical cable 15 providing a common enclosure of the multitude of ribbon fibers 9, 11, 13. The cable 15 extends from the telecommunication station 7 in a for example limited geographical area to reach subscribers therein at various places along the cable. At a place 3, 5 where there exist one or more subscribers a branch is made from the cable 15. At such a branching point one or more ribbon fibers are cut off, at the location 3 the ribbon fiber 9 and at the location 5 the ribbon fiber 11, as illustrated in FIG. 1. At the appropriate cut-off ends of the ribbon fibers they are rid of their outer protecting and maintaining sleeve to split them up into individual fibers. At a branch the rest of the ribbon fibers continue to other branching points. At a branch then, the rest of the ribbon fibers continue to other branching points and also the far end portions or distal portions 17 of the cut-off ribbon fibers which are not used continue to the non-connected end of the cable 15. In order to use these far end portions 17 of cut-off branched ribbon fibers, both cut-off ends are split into individual fibers 19, see the modified system depicted in FIG. 2. An individual fiber piece which extends from a line board 1 up to a branching point and which is not connected to a subscriber at this branching point is then connected to a fiber piece in the far end ribbon fiber portion 17 extending from the branching point to the end of the cable 15, as illustrated by the fiber pieces 21 at location 3. If there is no such individual fiber piece because there are more subscribers than there are individual fiber in the ribbon fiber, first the cut-off ends of the fiber portion close to the line board are connected to subscribers and then the rest of the subscribers are connected to individual fibers in the ribbon fiber portion 17 extending away from the branching point to the far end of the cable 15, as illustrated at location 5. In this way the far end, i.e. the end not connected to the station 7, of the cable 15 will contain both ribbon fibers having fibers which can be used for connections to new subscribers and ribbon fibers having fibers connected to subscribers which need to be connected to a line board 1.

Figure 2:
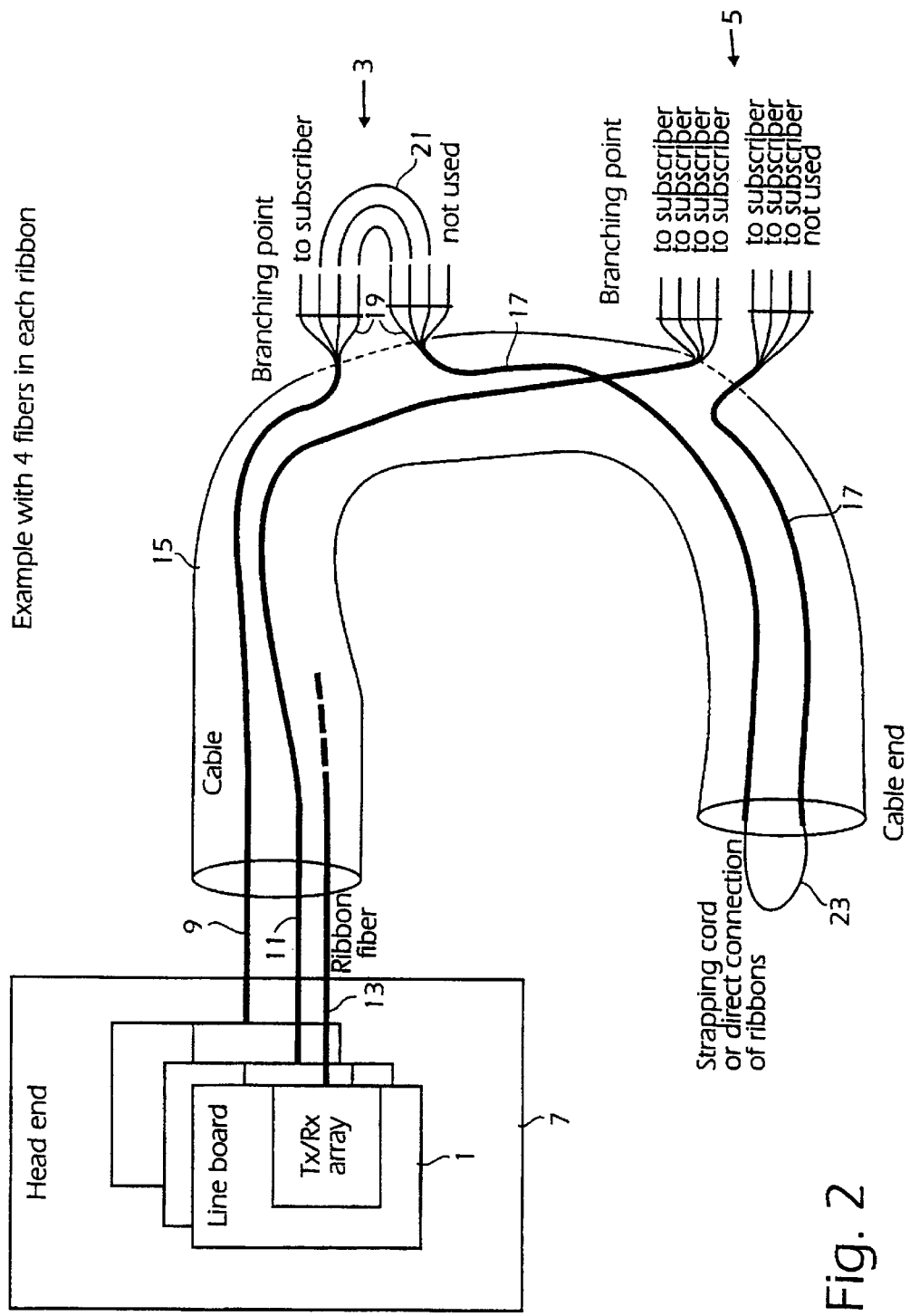
FIG. 2 is a schematic view of a portion of a telecommunication network similar to that of FIG. 1 but using multiple optical fibers in a fiber cable more efficiently.

At the far end of the cable 15 all the ribbon fibers of the cable are made accessible and then suitable ones of the ribbon fibers are there connected to other suitable ribbon fibers, as illustrated by the ribbon fiber piece 23 in FIG. 2. A ribbon fiber which is not used or is only partially used and thus has fibers, which are connected to the line board, is connected to another ribbon fiber having fibers which are connected to subscribers. Supposing that the fibers of a ribbon fiber are always numbered in the same way 1, 2, and that the connection of subscribers at the branching points is always made in the same way starting with fiber No. 1, then No. 2, etc., it will result in that the combination of two ribbons at the cable end can be made by having an inverted connection order. Then, in the case illustrated in FIG. 2 where ribbon fibers containing four fibers are used, fiber No. 1 in the first ribbon is connected to fiber No. 4 in the second ribbon, fiber No. 2 in the first ribbon is connected to fiber No. 3 in the second ribbon, etc. Alternatively other ways of connecting the fibers at the far end of the cable 15 can be arranged, for example by using individual fiber pieces interconnecting ends of two individual fibers in different ribbon fibers.

Provided there is a statistical distribution of subscribers - this condition can be approximately true if the numbers of subscribers and fiber ribbons in the cable are large 5 the use of array devices and fiber ribbons in the manner described above will be more efficient than using only fibers extending directly from the line board to the subscriber.

Figure 3:
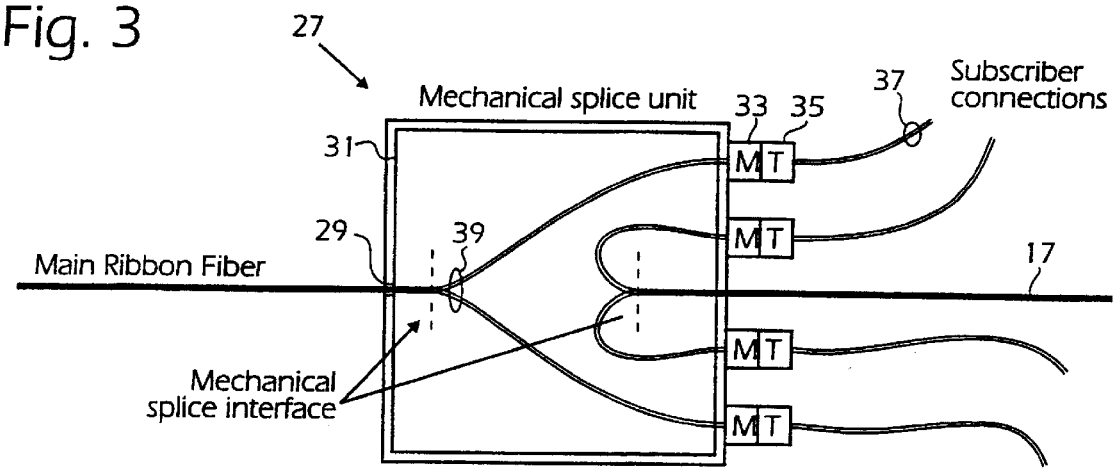
FIG. 3 is a view illustrating a mechanical splicing unit to be used when branching from the network of FIG. 1.

In FIG. 3 a mechanical splicing device 27 is shown which can be used when a branch is to be made from the cable 15, for example at the geographical area 5 of FIG. 1. The device 27 has an inlet 29 for a ribbon fiber 11 extending directly from a line board, the inlet being placed at a side of a rectangular housing 31. To the opposite side of the housing 31 are attached four standard MT-connectors 33, each one for two fibers, which are intended to be connected to mating connectors 35 of pairs of optical fibers 37, which extend directly to subscribers. Inside the housing 27 the four fibers 39 of the incoming ribbon fiber 11 are split into two groups of two fibers, so that the fibers of a group are connected to a respective MT-interface 33. Thus two MT-interfaces are connected to the incoming ribbon fiber 11. The other two MT-interfaces are connected to the optical fibers of the distant portion 17 of the same ribbon fiber, an end of this distant portion entering the housing 31 at the side where the MT-interfaces are located.

Figure 4:
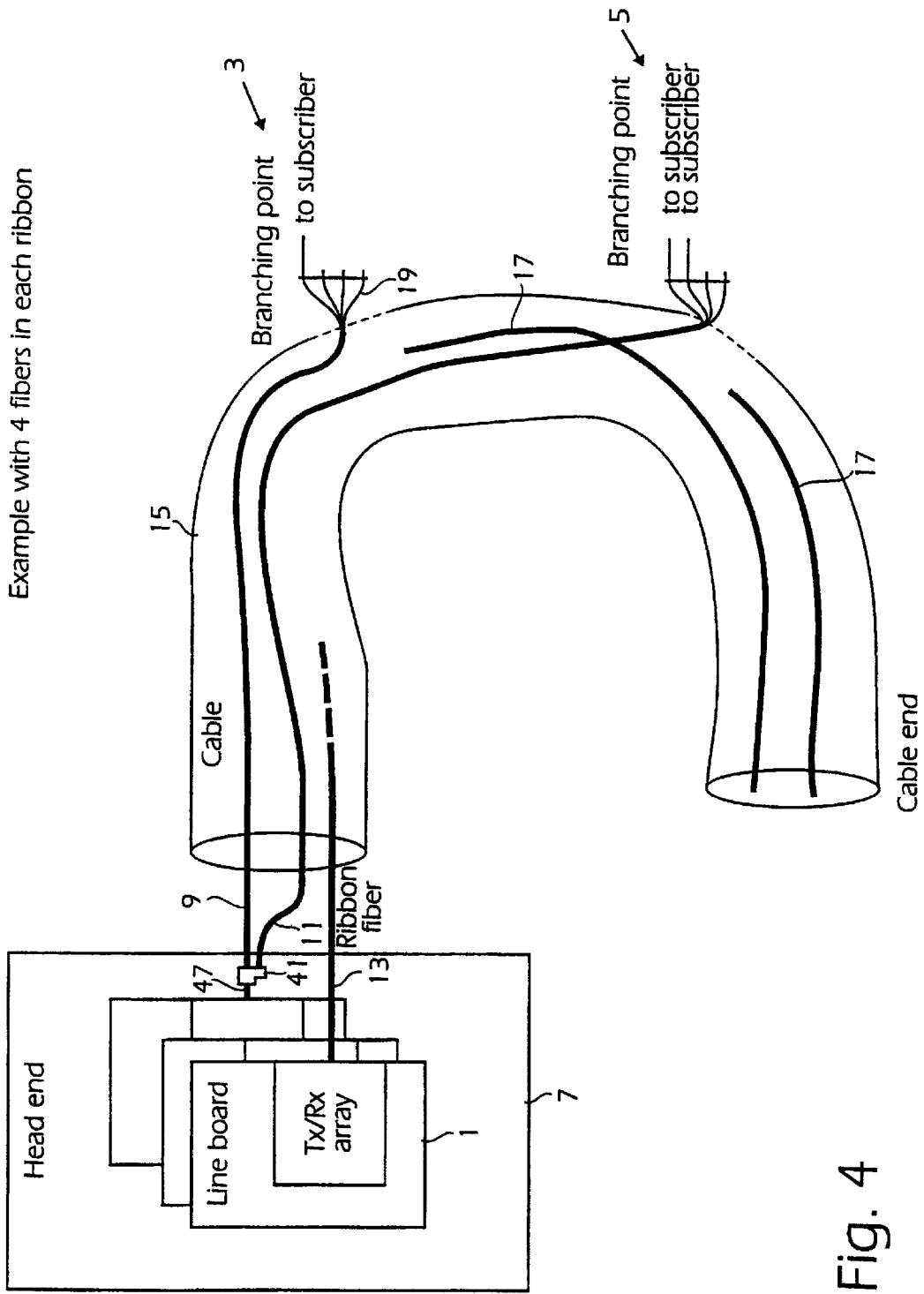
FIG. 4 is a schematic view of a portion of a telecommunication network similar to that of FIG. 1 but having a modified connection of a fiber cable to line boards.

In the example network of FIG. 1, in the ribbon fiber 9 only one individual optical fiber is used and in the fiber ribbon 11 two individual optical fibers are used. Thus only three optical fibers of the totally eight fibers are used in the ribbon fibers 9 and 11 which are assumed to contain four fibers each. It would then be possible to connect these individual fibers to only one line board 1 in the central station 7 and this case is illustrated in FIG. 4. There an optical connector 41 is used to combine the active optical fibers of each ribbon fiber 9 and 11 to one short fiber ribbon piece 47 which is connected to one of the line boards 1.

Figure 5:
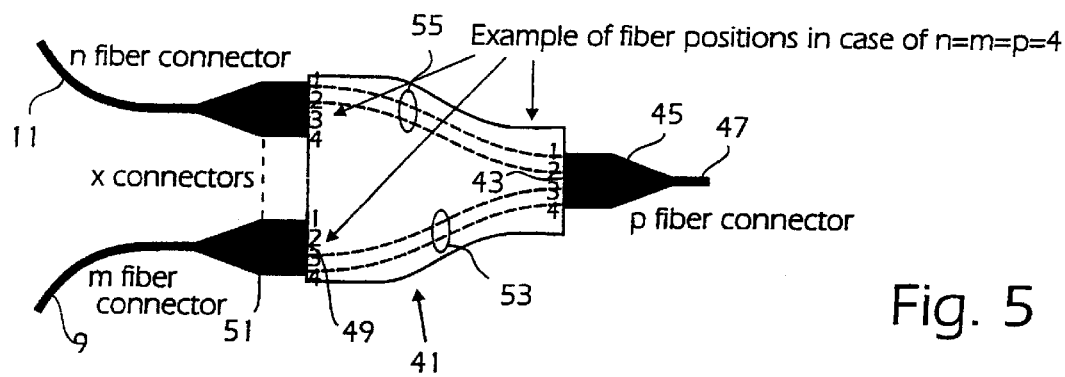
FIG. 5 is a view of a connector for connecting two fiber ribbons to one line board.

Such a connector 41 is illustrated in FIG. 5. The connector 41 thus has a body and is at its first side provided with a standard fiber interface 43, e.g. a MT connector, for connection of four fibers of a ribbon fiber. To this interface a matching standard connector 45 is connected to the ribbon fiber piece 47 connected to the line board 1. At the opposite side of the connector body 41 there are two standard interfaces 49 placed at the side of each other, located thus in the same plane. These interfaces connect to two standard connectors 51 fitted to the ribbon fibers 9, 11 respectively. Inside the connector 41 there are optical fibers 53 extending from all the connection points inside the interface 43 for connection to the line board 1. Two of these optical fibers 53 extend to connection points in the first one of the opposite interfaces 49 and the other two 55 to two connection points in the second one of the interfaces 49 on the opposite side, where the first one of the interfaces 49 is connected to the ribbon fiber 9 and the second one to the ribbon fiber 11. It means that two of the connection points of each of these interfaces 49 are not used or connected.

Figure 6:
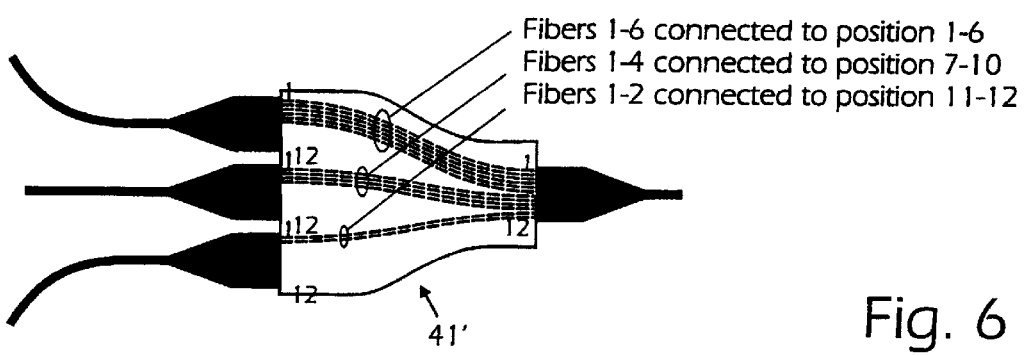
FIG. 6 is a view of a connector for connecting three fiber ribbons to one line board.

In FIG. 6 a similar connector 41' is illustrated which is adapted for ribbon fibers comprising twelve individual optical fibers. All the connection points of the interface at the line board side are connected to optical fiber pieces. Six of these fiber pieces are connected to one standard interface on the subscriber side, four are connected to another interface on the same side and the last two ones are connected to a third one of the interfaces on the subscriber side. In this case thus also only one line board 1 is used which would otherwise have required three line boards 1.

The fiber pieces 53, 53 inside the connector body 21 can be standard optical fibers or polymer fibers or be replaced by polymeric waveguides produced by a patterning process of a suitable polymeric substrate having different suitable layers applied on top of it.

In a later stage of building a network such as illustrated in FIGS. 1, 2, 4 perhaps more subscribers want to be connected to the optical fiber network and then the unused individual fibers of the ribbon fibers 9 and II will be used. Then more line boards 1 would be needed in the station 7 and then the connector 41 can be removed and each fiber ribbon 9, 11 is connected to a line board 1 of its own, as illustrated in FIGS. 1, 2. In the case where three individual ribbon fibers are connected to one line board 1, as is allowed by e.g. the connector 41' of FIG. 4, in the later stage of the use of the network when more subscribers are to be added, the connector 41 must be replaced by e.g. one connector of the kind illustrated in FIG. 5 connecting two ribbon fibers to one line board 1. Then one of the three ribbon fibers will be connected directly to a new, now added line board 1.

In most cases two optical fibers are used for each subscriber. This can mean that the individual optical fibers illustrated in the figures are actually fiber pairs and that for instance the connector of FIG. 5 can be adapted for connecting ribbon fibers containing eight individual optical fibers.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An optical fiber network comprising:
   a line station and at least one cable, the cable extending from a head end to a far end and holding a plurality of ribbon fibers each including individual optical fibers, the cable connected to the line station at the head end for transmitting and receiving information on the individual optical fibers included in the ribbon fibers;
   a plurality of spaced apart branching points provided at different locations of the cable between the head end and the far end of the cable, at each branching point at least one of the ribbon fibers being cut-off and at least one of the individual optical fibers in a cut-off ribbon fiber being connected to a subscriber, so that a cut-off ribbon fiber is divided into one head end ribbon fiber piece extending from the head end to one of the branching points and one far end ribbon fiber piece extending from said one of the branching points to the far end; and
   wherein in at least one of the branching points there is an end of an individual optical fiber in a head end ribbon fiber piece which is not connected to a subscriber and this end is connected to an end of an individual optical fiber in a far end ribbon fiber piece.

2. An optical fiber network comprising:
   at least one cable, the cable extending from a head end to a far end and holding a plurality of ribbon fibers each including individual optical fibers, the cable connected to a line station at the head end for transmitting and receiving information on the individual optical fibers included in the ribbon fibers;
   the optical fiber network further comprising a plurality of spaced apart branching points provided at different lengthwise locations of the cable between the head end and the far end of the cable, wherein at each branching point at least one of the ribbon fibers is cut-off and at least one of the individual optical fibers in a cut-off ribbon fiber is connected to a subscriber, so that a cut-off ribbon fiber is divided into one head end ribbon fiber piece extending from the head end to one of the branching points and one far end ribbon fiber piece extending from said one of the branching points to the far end; and
   wherein in at least one of the branching points subscribers are connected to individual optical fibers included in the head end ribbon fiber piece and the far end ribbon fiber piece of one of the ribbon fibers.

3. An optical fiber network comprising:
   at least one cable, the cable extending from a head end to a far end and holding a plurality of ribbon fibers each including individual optical fibers, the cable connected to a line station at the head end for transmitting and receiving information on the individual optical fibers included in the ribbon fibers;
   the optical fiber network further comprising a plurality of spaced apart branching points provided at different lengthwise spaced apart locations between the head end and the far end of the cable, at each branching point at least one of the ribbon fibers being cut-off and at least one of the individual optical fibers in a cut-off ribbon fiber being connected to a subscriber, so that a cut-off ribbon fiber is divided into one head end ribbon fiber piece extending from the head end to one of the branching points and one far end ribbon fiber piece extending from said one of the branching points to the far end; and wherein at the far end of the cable at least one of the individual optical fibers included in one of the ribbon fibers is connected to an individual optical fiber included in another of the ribbon fibers.

4. The optical fiber network of claim 3, wherein at the far end of the cable at least one of the ribbon fibers is connected to another of the ribbon fibers, so that all the individual optical fibers included in said one of the ribbon fibers are connected to an individual optical fiber included in said another of the ribbon fibers.

5. An optical fiber network comprising:

at least one cable, the cable extending from a head end to a far end and holding a plurality of ribbon fibers each including individual optical fibers, the cable connected to a line station at the head end for transmitting and receiving information on the individual optical fibers included in the ribbon fibers;

the optical fiber network further comprising a plurality of spaced apart branching points provided at different spaced apart locations between the head end and the far end of the optical cable, at each branching point at least one of the ribbon fibers being cut off and at least one of the individual optical fibers included in a cut-off ribbon fiber connected to a subscriber, the line station comprising line boards each adapted to be connected to only one of the ribbon fibers; and wherein at the head end of the cable at least two of the ribbon fibers are connected to the same line board so that there are individual optical fibers included in each of said at least two ribbon fibers which arc not connected to the line board.

* * * * *